Oct. 21, 1952     T. H. HANSEN     2,614,529

FILTER AERATOR FOR AQUARIA

Filed Jan. 10, 1951

INVENTOR.
THORWALD H. HANSEN

BY

ATTORNEY

UNITED STATES PATENT OFFICE 2,614,529

FILTER AERATOR FOR AQUARIA

Thorwald H. Hansen, Rahway, N. J.

Application January 10, 1951, Serial No. 205,351

13 Claims. (Cl. 119—5)

The present invention is directed to equipment intended to be used in connection with aquaria or the like, more particularly to a device capable of aerating and filtering the water in the aquarium.

The pastime of cultivating fish in the home, especially tropical fish, has become quite popular. The aquaria that are normally used for this purpose are relatively small and the water is practically stationary and is not replaced except at intervals of time. Since the fish require air, it has been customary to bubble such air through the water, requiring a pump of suitable character. There is also developed excretion from the fish and other foreign matter is likely to fall into the aquarium so that cleansing of the water has been considered necessary. This is usually accomplished by the provision of special filtering materials.

Among the devices which have been proposed in the prior art for accomplishing this result was a tube vertically placed in the aquarium, with the lower open end embedded in the sand at the bottom thereof. The upper end was formed into a goose neck terminating just above the level of the water in the aquarium. A second tube of smaller diameter was held within the vertical portion of the first tube and extended to substantially the bottom thereof. Air introduced into the smaller tube was forced against the upward flow of water and was quite ineffective and impractical. While aeration was possible with this device, it suffered from a number of disadvantages in that it required a considerable amount of power to raise the water, necessitating the use of a relatively large pumping equipment, even though the aquarium was relatively small. Because of the arrangement of the tubes, clogging often occurred, thus interfering with the aeration. By reason of the location of the tube in the sand or gravel, but very little filtering effect was obtainable thereby.

In another device of the prior art intended to accomplish the same purpose, there was provided in the bottom of the aquarium a tube having an enlargement in which a porous disk of suitable material was placed. A pipe connection was provided therefrom to a source of air whereby air was forced directly into the water in the aquarium. This device was incapable of providing any filtering action so that refuse and dirt accumulated in the aquarium. Because of the porous character of the disk, the air was finely subdivided and absorption thereof took place, but the area over which the action occurred was rather limited. Also, it required a considerable amount of power to force the air through the pores of the disk.

The present invention is intended and adapted to overcome the difficulties and disadvantages inherent in prior devices of the type described, it being among the objects of the present invention to provide a combined aerating and filtering device, which is simple in construction and highly effective in operation.

It is also among the objects of the present invention to provide a device for the above described purpose, which requires a minimum of power while at the same time providing excellent aeration and effective circulation of the water.

It is further among the objects of the present invention to provide a device which does not require frequent cleaning or removal, which may be readily cleaned when necessary, which requires no additional filtering material and which does not require any substantial amount of difficulty to the user in adapting and operating the same.

In practicing the present invention, there is provided a tube which is vertically placed in the aquarium and has a head, such as a goose neck at the upper end thereof. Attached to the bottom of the tube or integral therewith is an enlarged portion which is open at its lower end and is substantially completely embedded in the sand at the bottom of the aquarium. The lower end thereof is spaced from the bottom of the tank by a small distance, usually about one-half inch.

There is also provided an air tube of lesser diameter than the water tube and preferably is attached to the outer surface thereof although it may be formed integral therewith. The air tube extends down below the surface of the water in the aquarium and may be set anywhere above the gravel. There is an upward extension at the lower end of the air tube which is at an angle to the water tube and usually at about 45° thereof. The outer end of the extension is preferably closed by a removable plug to allow cleaning, if necessary.

In the operation of the device it is placed in the aquarium and air is caused to flow through the air pipe, entering into the water pipe in relatively large bubbles which practicaly completely fill the water tube and force water upward through the goose neck while at the same time giving excellent aeration. The water tube is smooth and has no obstructions so that there is no tendency for foreign matter to accumulate therein. Also, there is no interference with the flow of water. The enlargement at the lower end being usually filled with sand and being of substantial depth, provides a very effective filter for the water. Thereby the foreign matter in the aquarium is concentrated and usually deposited within or adjacent to the enlargement and at infrequent intervals may be easily removed.

In the accompanying drawing constituting a part hereof and in which like reference characters indicate like parts, Fig. 1 is a side elevational view of an aquarium provided with a device made in accordance with the present invention, some parts being broken away for clearness and showing a goose neck form of head;

Figure 1:
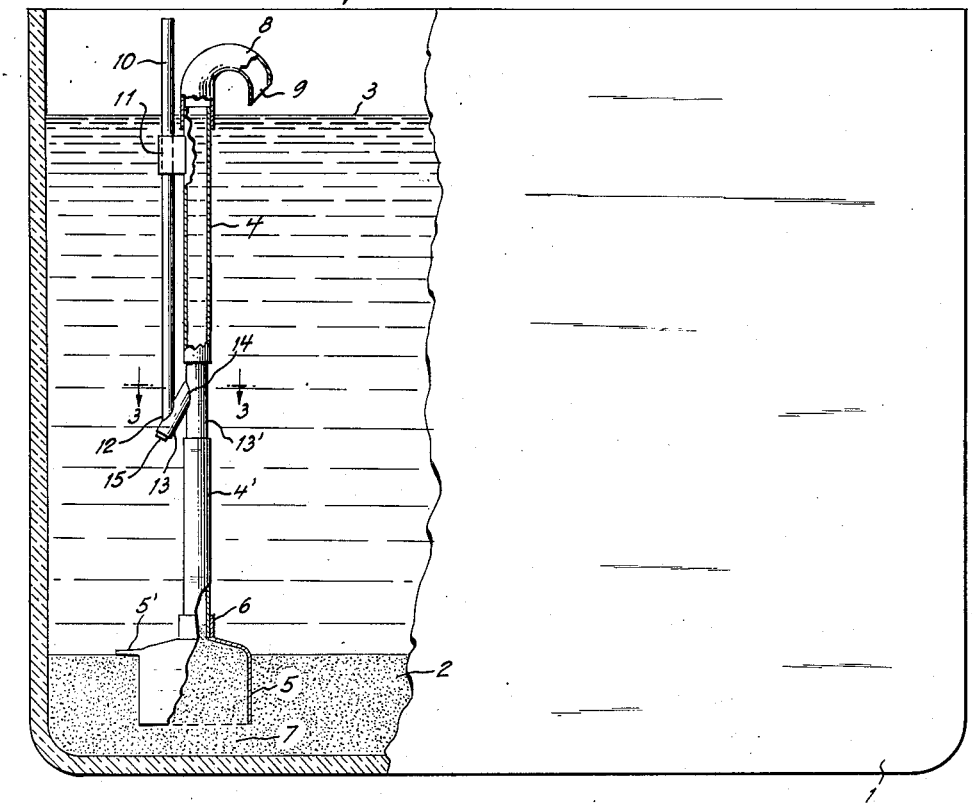

The tank or aquarium 1 is provided with a bed of fine gravel or very coarse sand 2, which may be of any desired depth but usually from one and one-half to two inches. The aquarium is filled with water to the level 3.

A vertical water-tube 4 of any suitable material, such as glass, metal, plastic or the like, is placed in one side of the aquarium. An enlargement or dome 5 is secured at 6 to the lower end 4' of tube 4. This enlargement is of such a diameter that the cross-sectional area thereof is at least three times that of water tube 4. The height of the enlargement is usually around one to one and one-half inches. A lateral projection 5' is provided to act as a stop to gage the level to which the device is inserted into the aquarium gravel 2. A space 7 is usually left between the open end of enlargement 5 and the bottom of aquarium 1, this space being of the order of one-half inch. The upper end 8 of water tube 4 is straight or is formed into a goose neck, with the open end 9 thereof being slightly above water level 3.

Figure 2:
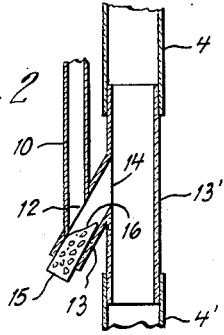
Fig. 2 is an enlarged fragmentary vertical cross-sectional view of the water pipe and air pipe at the point where the extension connects the two.
Figure 3:
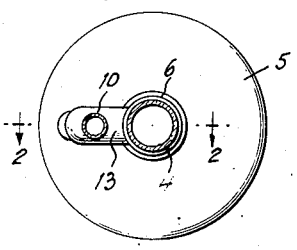
Fig. 3 is a fragmentary horizontal cross-sectional view taken along line 3—3 of Fig. 1.

An air-tube 10 of lesser diameter than water tube 4 is held in parallel relationship to the water tube by loop 11 or it may be otherwise attached thereto or made integral therewith. Lower end 12 of air tube 10 terminates at the air chamber above the bottom of the aquarium. End 12 fits into an upward extension 13 which enters section 13' of the water tube. The diameter of the extension is usually from one-third to one-half the diameter of water tube 4. Plug 15 having a tapered inner face 16 is inserted in the open end of extension 13; the removal of plug 15 provides means for cleaning any accidental accumulation of foreign matter in the extension. End 12 is bevelled at an angle to air-tube 10 that it may be fitted as shown in Fig. 2 to permit an air bubble of maximum size; or tube 10 may be twisted to control the size of the effective opening and the size of the bubble. Section 13' is fitted onto water-tube sections 4 and 4' for convenience in the assembly and also to accommodate various lengths of tubes 4 and 4' for various conditions of use.

Figure 4:
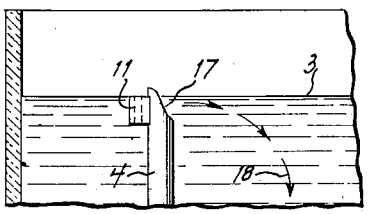
Fig. 4 is a fragmentary detailed view of a modified form of head.

Goose neck 8 is made detachable in the preferred form and may be replaced by a head of different type as shown in Fig. 4. The upper end 17 of water-tube 4 is bevelled at a sharp angle to the horizontal to form a V-shaped notch below the water level. Thereby a circulation of water as shown by arrows 18 throughout the aquarium is obtained. Also the top of tube 4 may terminate below the water level a substantial distance so that noiseless aeration is obtained.

The diving bell shaped base is thin walled and can be pushed into the gravel and be removed without creating a disturbance of the aquarium gravel. The term "aquarium gravel" denotes a fine gravel which is about one-eighth inch kernels. It is slightly coarser than coarse sand. Practically all aquaria have aquarium gravel which provides a footing for the roots of the plants. The upper end of the device can be a short vertical straight tubing of such length and diameter, in which the air adjusted in the air chamber will lift the water without back pressure and expel the water and air at a predetermined distance below the surface of the aquarium water, noiselessly.

The air tube extends down to the upward extension at the lower end of the water tube. The upward movement of water sets up no back pressure; hence, it is possible to inject air near the bottom of the water tube just above the gravel so that the air stream can be seen at all times. The shape of the air chamber, the shape of the plug and the air tube provide the means of changing the size of the air bubble. The bevelled lower end of the air tube provides a means for adjusting the amount of air by the twisting of the air tube so that one may accurately adjust the size of the air bubbles so that they substantially completely fill the water tube. Because of this, the relative sizes of the air and water tubes may be varied to a considerable extent without impairing the functioning of the device. The tapered inner faces of the plug assists the air in passing from the air tube into the central section of the water tube.

The device may be cleaned in a very simple manner. The user merely twists the device while lifting it up out of the gravel at the same time and, therefore, there is no disturbance of the water in the aquarium, which remains clear. The operation of the device is visible at all times and under all conditions so that necessary adjustments may be readily made. The device may be shifted to any part of the aquarium and may be put in place by gentle twisting and downward pressure.

Because of the construction of the device, a small air pump which is practically noiseless and is of moderate cost may be used. In fact, such a small pump may in some cases serve more than one aquarium. The device being made in sections is readily adaptable to various sizes of aquaria by changing the length of the water tube and air tube. Any kind of head may be placed on the top of the water tube or the head may even be omitted. The several elements may be made of any suitable material but preferably of a transparent plastic so that it is non-breakable.

I claim:

1. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube attached to the outside of said water-tube, said air-tube entering the side of said water-tube, air passing through said water-tube drawing water upwardly therein and through said gravel to filter said water.

2. Apparatus for simultaneously aerating and filtering the water in an aquarium which comprises a tank having a bed of aquarium gravel or the like in the bottom thereof, a substantially vertical water-tube having an enlargement at the lower end thereof, the cross-sectional area of said enlargement being at least three times that of said water-tube, said enlargement being open at its lower end and being substantially embedded in said gravel and spaced from the floor of said tank, an air-tube of lesser diameter than said water-tube and attached to the outside thereof, said air-tube entering the side of said water-tube, air passing through said water-tube drawing water upwardly therein and through said gravel to filter said water.

3. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube of lesser diameter than said water-tube and attached to the outside thereof, said air-tube entering the side of said water-tube above the gravel when installed in an aquarium, air passing through said water-tube drawing water upwardly therein and through said gravel to filter said water.

4. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube of lesser diameter than said water-tube and attached to the outside thereof, the lower end of said air-tube having an upward extension into the side of said water-tube, air passing through said water-tube drawing water upwardly therein and through said gravel to filter said water.

5. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube of lesser diameter than said water-tube having an upward extension into the side of said water-tube, and a removable plug in the outer end of said extension, air passing through said water-tube drawing water upwardly therein and through said gravel to filter said water.

6. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube of lesser diameter than said water-tube and attached to the outside thereof, the lower end of said air-tube having an upward extension into the side of said water-tube, the angle between said extension and said water-tube being of the order of 45°, air passing through said water-tube drawing water upwardly therein and through said gravel to filter said water.

7. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube of lesser diameter than said water-tube and attached to the outside thereof, the lower end of said air-tube having an upward extension into the side of said water-tube, the diameter of said extension at the point of entry thereof into said water-tube being approximately one-third the diameter of said water-tube, air passing through said water-tube drawing water upwardly therein and through said gravel to filter said water.

8. Apparatus for simultaneously aerating and filtering the water in an aquarium which comprises a tank having a bed of aquarium gravel or the like in the bottom thereof, a substantially vertical water-tube having an enlargement at the lower end thereof, the cross-sectional area of said enlargement being at least three times that of said water-tube and the height of said enlargement being at least one inch, said enlargement being open at its lower end and being substantially embedded in said gravel and spaced from the floor of said tank, an air-tube of lesser diameter than said water-tube and attached to the outside thereof, said air-tube entering the side of said water-tube, air passing through said water-tube drawing water upwardly therein and through said gravel to filter said water.

9. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube attached to the outside of said water-tube, said air-tube entering the side of said water-tube, the lower end of said air-tube having an upward extension secured to a central section of said water-tube, said section being detachable, air passing through said water-tube drawing water upwardly therein and through said gravel to filter said water.

10. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube attached to the outside of said water-tube, said air-tube entering the side of said water-tube, the lower end of said air-tube having an upward extension secured to a central section of said water-tube, a plug in said extension, the inner face of said plug being tapered, air passing through said water-tube drawing water upwardly therein and through said gravel to filter said water.

11. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube attached to the outside of said water-tube, said air-tube entering the side of said water-tube, the lower end of said air-tube having an upward extension secured to a central section of said water-tube, said air-tube being fitted into said extension and adapted to be rotated, air passing through said water-tube drawing water upwardly therein and through said gravel to filter said water.

12. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube attached to the outside of said water-tube, said air-tube entering the side of said water-tube, the lower end of said air-tube having an upward extension secured to a central section of said water-tube, said air-tube being fitted into said extension and adapted to be rotated, the lower end of said air-tube being bevelled, air passing through said water-tube drawing water upwardly therein and through said gravel to filter said water.

13. Apparatus for simultaneously aerating and filtering the water in an aquarium which comprises a tank having a bed of aquarium gravel or the like in the bottom thereof, a substantially vertical water-tube having an enlargement at the lower end thereof, said enlargement being open at its lower end and being substantially embedded in said gravel and spaced from the floor of said tank, an air-tube of lesser diameter than said water-tube and attached to the outside thereof, the lower end of said air-tube having an upward extension into the side of said water-tube, air passing through said water-tube drawing water upwardly therein and through said gravel to filter said water, and an upper section on said water-tube and terminating below the water level in said aquarium.

THORWALD H. HANSEN.

REFERENCES CITED

The following references are of record in the file of this patent:

UNITED STATES PATENTS

| Number | Name | Date |
|---|---|---|
| 653,160 | Williamson | July 3, 1900 |
| 894,056 | Rogers | July 21, 1908 |
| 1,055,082 | Rogers | Mar. 4, 1913 |
| 1,574,783 | Beth | Mar. 2, 1926 |
| 2,491,853 | Feldman | Dec. 20, 1949 |